(12) United States Patent
Nagpal et al.

(10) Patent No.: US 9,489,404 B2
(45) Date of Patent: Nov. 8, 2016

(54) DE-DUPLICATING DATA IN A NETWORK WITH POWER MANAGEMENT

(75) Inventors: Abhinay R. Nagpal, Pune (IN); Sandeep R. Patil, Pune (IN); Sri Ramanathan, Lutz, FL (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 12/893,851

(22) Filed: Sep. 29, 2010

(65) Prior Publication Data

US 2012/0078858 A1    Mar. 29, 2012

(51) Int. Cl.
*G06F 17/00*    (2006.01)
*G06F 17/30*    (2006.01)

(52) U.S. Cl.
CPC ............................. *G06F 17/30303* (2013.01)

(58) Field of Classification Search
CPC ............................................. G06F 17/30303
USPC ........................................................ 707/609
See application file for complete search history.

(56) References Cited

U.S. PATENT DOCUMENTS

| | | | |
|---|---|---|---|
| 6,256,675 B1 * | 7/2001 | Rabinovich | 709/241 |
| 7,079,341 B2 | 7/2006 | Kistler et al. | |
| 7,603,529 B1 | 10/2009 | MacHardy et al. | |
| 7,631,155 B1 | 12/2009 | Bono et al. | |
| 2008/0276016 A1 | 11/2008 | Fujibayashi | |
| 2009/0089483 A1 | 4/2009 | Tanaka et al. | |
| 2009/0276647 A1 | 11/2009 | Boyd | |
| 2009/0313312 A1 | 12/2009 | Colbeck et al. | |
| 2011/0213994 A1 * | 9/2011 | Thereska et al. | 713/320 |

OTHER PUBLICATIONS

"Gartner Says a Green Data Centre Means More than Energy Efficiency", Egham, UK, Oct. 20, 2008, pp. 1-2 http://www.gartner.com/it/page.jsp?id=781012&format=print.
"IBM Unveils Plan to Combat Data Center Energy Crisis; Allocates $1 Billion to Advance "Green" Technology and Services", IBM press release May 10, 2007, New York, pp. 1-5 http://www.03-ibm.com/press/us/en/pressrelease/21524.wss.
"IBM Project Big Green Tackles Global Energy Crisis", IBM press release, Jun. 11, 2008, Armonk NY, pp. 1-5 http://www-03.ibm.com/press/us/en/pressrelease/24395.wss.

(Continued)

*Primary Examiner* — Mariela Reyes
*Assistant Examiner* — Mohsen Almani
(74) *Attorney, Agent, or Firm* — Yee & Associates, P.C.; Lisa J. Ulrich

(57) ABSTRACT

A method, computer system, and computer program product for managing copies of data objects in a network data processing system. The computer system identifies copies of a data object stored on storage devices. The computer system places the storage devices into groups. Each storage device in a group has a smallest distance from the storage device to a center location for the group as compared to distances to center locations for other groups within the groups. The computer system selects a portion of the copies of the data object for removal from the storage devices based on a management of power for the storage devices such that remaining set of storage devices in each group is capable of handling concurrent requests that have been made historically for the copies of the data object. The computer system removes the portion of the copies of the data object from the storage devices.

27 Claims, 11 Drawing Sheets

(56) References Cited

OTHER PUBLICATIONS

Beck, "Energy Smart Data Centers: Applying Energy Efficient Design and Technology to the Digital Information Sector", Nov. 2001, REPP Research Report No. 14, pp. 1-30.

Gurumurthi et al., "DRPM: Dynamic Speed Control for Power Management in Server Class Disks", Proceedings of International Symposium on Computer Architecture, IEEE CS Press, 2003, pp. 169-179.

Heath et al., "Application Transformations for Energy and Performance-Aware Device Management", Proc. Intl Conf. Parallel Architectures and Compilation Techniques (PACT 2002), IEEE CS Press, 2002, pp. 121-130.

Chatradhi, "Hard Drive for Low Power Energy Efficiency Disk Storage", Hitachi Global Storage Technologies, Jun. 2009, pp. 1-24.

"How to make use of Harddisk Power Management Features", pp. 1-2, retrieved Feb. 5, 2010 http://www.thinkwiki.org/wiki/How_to_make_use_of_Harddisk_Power_Managagement_Features.

"Technology: Power Managed Raid Software", Copan Systems, 1 page, retrieved May 1, 2010 www.copansystems.com/technology/power_managed_raid.php.

"DeltaStor Data Deduplication Software", SEPATON, pp. 1-2 retrieved May 1, 2010 http://sepaton.com/product-tour/deltastor-data-deduplicaiton.

"Gray Code", PC in Control, 2008, pp. 1-2 http://www.pc-control.co.uk/gray_code.html.

Gray code, Wikipedia, pp. 1-10, retrieved May 1, 2010.

"k-means clustering", Wikipedia, pp. 1-5, retrieved May 1, 2010.

Liu et al., "Semantic Data De-duplication for Archival Storage Systems", 2008, IEEE, pp. 1-9, The Thirteenth IEEE Asia-Pacific Computer Systems Architecture Conference (ACSAC 2008) Hsinchu, Taiwan.

Fichera et al., "Power and Cooling Heat Up the Data Center", Mar. 8, 2006, Forrester Research, pp. 1-2.

"K-Means Clustering—Example", pp. 1-8, retrieved Sep. 1, 2010 http://faculty.uscupstate.edu/atzacheva/SHIM450/KMeansExample.doc.

\* cited by examiner

| STORAGE DEVICES | POWER MANAGEMENT PROFILE IDENTIFIERS | REQUESTS (MILLIONS) |
|---|---|---|
| A1 | 2 | 10 |
| A2 | 2 | 5 |
| A3 | 8 | 4 |
| A4 | 5 | 8 |
| A5 | 7 | 5 |
| A6 | 6 | 4 |
| A7 | 1 | 2 |
| A8 | 4 | 9 |

FIG. 5

| POWER MANAGEMENT PROFILE IDENTIFIERS | POWER MANAGEMENT PROFILE CODES |
|---|---|
| 1 | 001 |
| 2 | 011 |
| 3 | 010 |
| 4 | 110 |
| 5 | 111 |
| 6 | 101 |
| 7 | 100 |
| 8 | 000 |

FIG. 6

| 802 | 804 | 806 (2, 10) 814 | (5, 8) 808 816 | (1, 2) 810 818 | 812 |
|---|---|---|---|---|---|
| STORAGE DEVICES | LOCATIONS | FIRST DISTANCE | SECOND DISTANCE | THIRD DISTANCE | GROUPS |
| A1 | (2, 10) | 0 | 5 | 9 | 1 |
| A2 | (2, 5) | 5 | 6 | 4 | 3 |
| A3 | (8, 4) | 12 | 7 | 9 | 2 |
| A4 | (5, 8) | 5 | 0 | 10 | 2 |
| A5 | (7, 5) | 10 | 5 | 9 | 2 |
| A6 | (6, 4) | 10 | 5 | 7 | 2 |
| A7 | (1, 2) | 9 | 10 | 0 | 3 |
| A8 | (4, 9) | 3 | 2 | 10 | 2 |

DE-DUPLICATING DATA IN A NETWORK WITH POWER MANAGEMENT

BACKGROUND

1. Field

The present invention relates generally to the management of data and, more particularly, to managing data in a network data processing system. Still more particularly, the present disclosure relates to a method and apparatus for data de-duplication in a network data processing system.

2. Description of the Related Art

Network data processing systems provide access to information and applications for users. Network data processing systems come in a number of different forms. For example, a network data processing system may include a local area network, a wide area network, the Internet, or some other suitable form of network. When a network data processing system takes the form of a "cloud", the cloud also may provide applications for use by a user. For example, a user may work on a document at one client computer. The user may then send the document to the second computer to continue to work on a document there. The user does not need to select the client computer or make changes to the second client computer to access the document. The application used to work on the document is supplied by the cloud to the client computer at which the user is located.

With a cloud, client computers and other data processing systems access information stored in the cloud. As a result, a user may access information from different computers without having to carry the information in a portable storage device or send the information from one computer to another computer. For example, a user may work on documents and spreadsheets at one computer. The user may then travel to another location and access the same documents and spreadsheets at a second computer.

With clouds, data is often stored in different locations. For example, a document may have a hundred copies. If the document is backed up or archived, all one hundred of these copies are saved by the cloud. As a result, inefficient use of storage and other resources may occur by storing all of the copies.

One manner in which duplicate copies of data is managed is through the use of data de-duplication. Data de-duplication is a process for eliminating redundant data and reduce the amount of storage needed.

With data de-duplication, copies of data are reduced. Even redundant portions of files and other data can be removed. With this process, the extra copies of data that are removed are replaced with a reference to the copy of the data that is not removed.

SUMMARY

The different illustrative embodiments provide a method, computer system, and computer program product for managing copies of data objects in a network data processing system. In one illustrative embodiment, the computer system identifies copies of a data object stored on a plurality of storage devices. The computer system places the plurality of storage devices into groups in which a storage device in a group within the groups has a smallest distance from the storage device to a center location for the group as compared to distances from the storage device to center locations for other groups within the groups. The computer system selects a portion of the copies of the data object for removal from the plurality of storage devices based on a management of power for the plurality of storage devices such that a remaining set of storage devices in each group within the groups is capable of handling concurrent requests that have been made historically for the copies of the data object. The computer system removes the portion of the copies of the data object from the plurality of storage devices.

BRIEF DESCRIPTION OF THE SEVERAL VIEWS OF THE DRAWINGS

FIG. 5 is an illustration of a table identifying power management profiles and predicting access for storage devices in accordance with an illustrative embodiment;

FIG. 6 is an illustration of a table identifying power management profile identifiers for different power management profiles in accordance with an illustrative embodiment;

DETAILED DESCRIPTION

Figure 1:
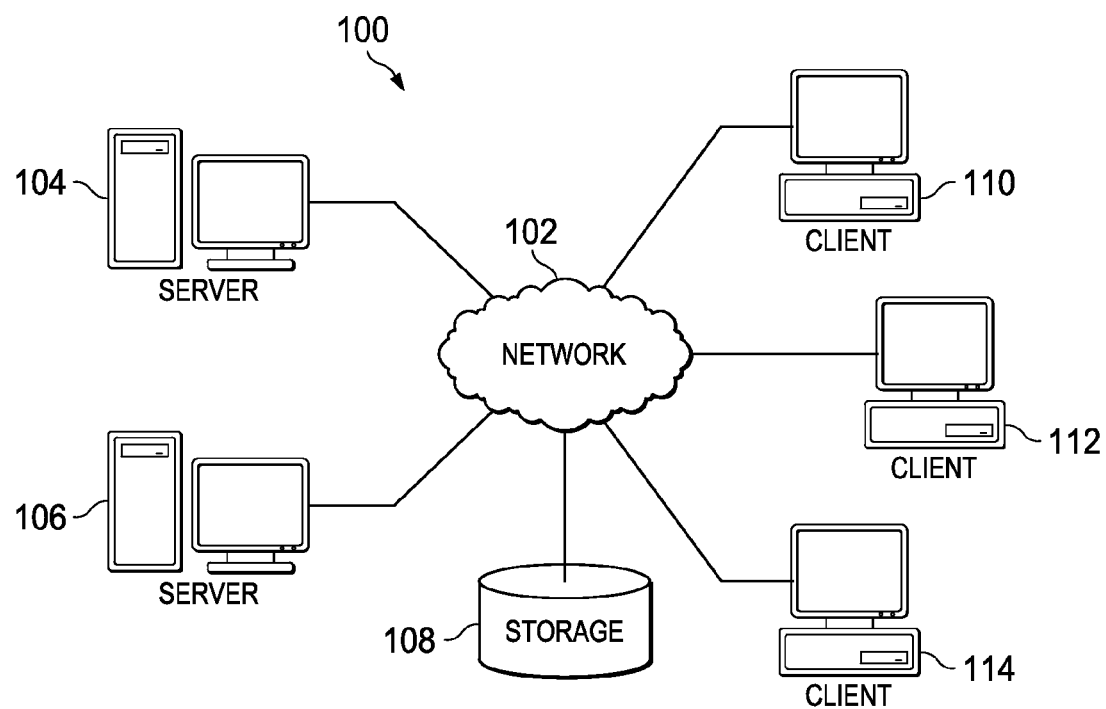
FIG. 1 is an illustration of a network of data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system."

Furthermore, the present invention may take the form of a computer program product comprising computer readable program code stored on a tangible computer readable storage device.

Any combination of one or more computer readable device(s) may be utilized. The tangible computer readable storage device may be, for example, an electronic, magnetic, optical, electromagnetic, infrared, or semiconductor system, apparatus, or device. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disk read-only memory (CDROM), an optical storage device, or a magnetic storage device.

The computer program can be stored on a fixed or portable computer readable storage media or downloaded from the Internet via a network in which the network includes electrical, optical and/or wireless communication links, routers, switches, etc.).

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus via a computer readable RAM such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded and installed onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

With reference now to the figures and, in particular, with reference to FIG. 1, an illustration of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is an illustration of a network of data processing systems in which illustrative embodiments may be implemented. Network data processing system 100 is a network of computers in which the illustrative embodiments may be implemented. Network data processing system 100 contains network 102, which provides communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, data processing systems, and other devices not shown.

Program code located in network data processing system 100 may be stored on a computer recordable storage device and downloaded to a data processing system or other device for use. For example, program code may be stored on a computer recordable storage device on server computer 104 and downloaded to client computer 110 over network 102 for use on client computer 110. One or more illustrative embodiments may be implemented to manage copies of data on network data processing system 100. In particular, one or more illustrative embodiments may be implemented to reduce the number of copies of data in a manner that reduces time needed to process requests for the data.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a cloud, a local area network (LAN), or a wide area network (WAN). FIG. 1 is intended as an example and not as an architectural limitation for the different illustrative embodiments.

Figure 2:
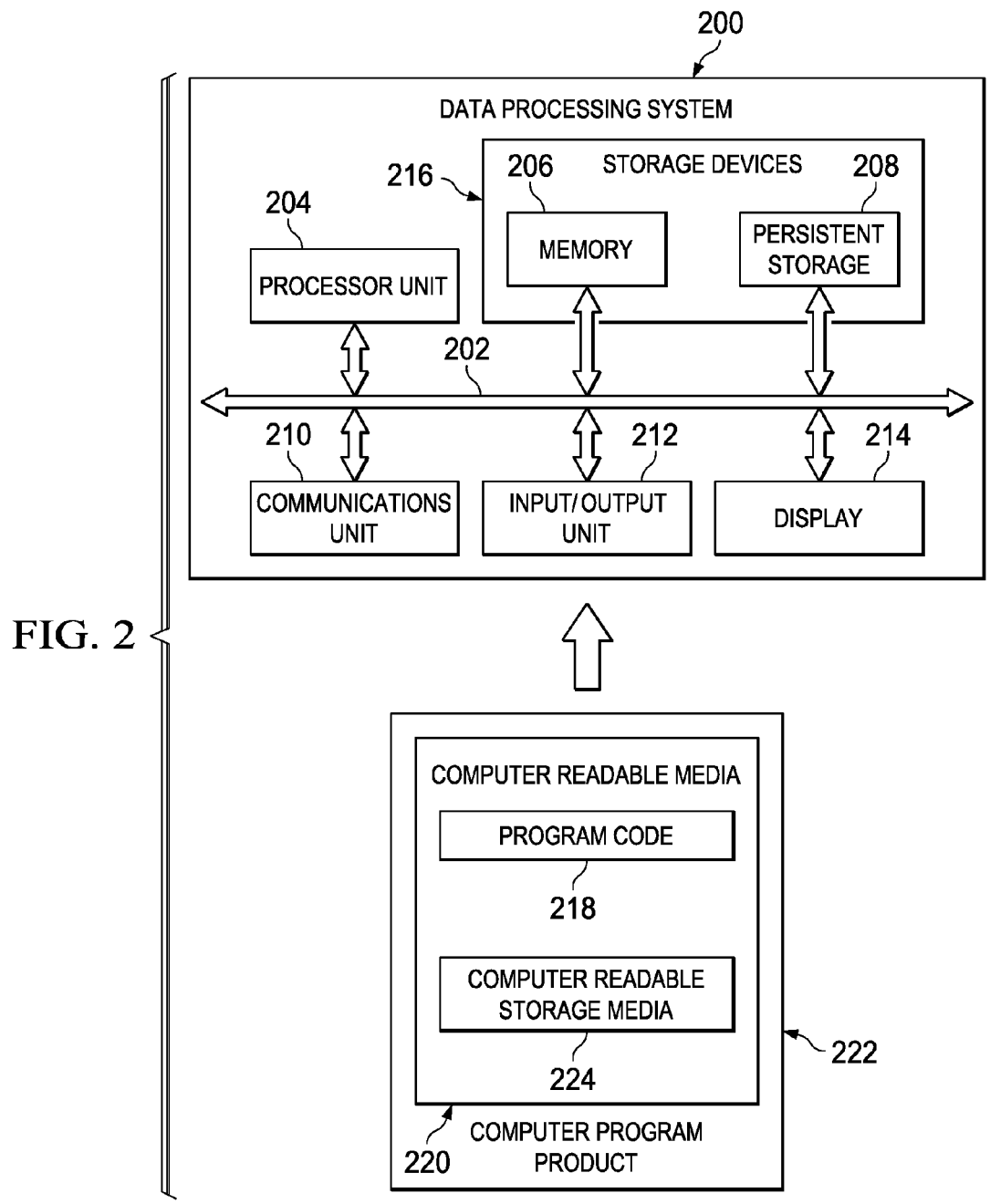
FIG. 2 is an illustration of a data processing system in which illustrative embodiments may be implemented.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a central processing unit (CPU), a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware such as disk storage that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222 in these examples. In one example, computer readable media 220 may be computer readable storage media. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is also referred to as a computer readable storage device.

Alternatively, program code 218 may be transferred to data processing system 200 using communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize and take into account that the speed at which data can be accessed in a network data processing system is an important factor. The different illustrative embodiments recognize and take into account that one manner for optimizing the performance of hard drives in these types of storage systems is to use hard drives with higher speeds. The speeds are measured in revolutions per minute (RPM). Higher speeds reduce time needed for access reads and disk writes. However, a faster hard drive also consumes more power and tends to be more expensive than slower hard drives.

The different illustrative embodiments recognize and take into account that clouds and other types of networks include power management systems. The power management systems are often implemented in different computers in the network data processing system. The power management system may be implemented to control various components in a computer, such as a process server, a communications adapter, a storage device, and other suitable components.

As a result, many hard drives have power saving features built into the hard drives that allow for different levels of power savings. These power savings may include disabling the server, lowering the spin rate of the platter, unloading the read-write head, powering off the circuits in the hard disk drive, and other suitable features. These types of features may also be referred to as power management features.

The different illustrative embodiments recognize and take into account that different hard drives holding copies of data may have different power management settings. The different illustrative embodiments recognize and take into account that in reducing the number of copies of data from the different storage devices, a reduction in performance may occur if the power management used by the storage devices is not taken into account.

For example, if data resides on two hard disk drives using different types of power management, the selection of the particular hard disk drive for which duplicate data is to be removed may reduce performance. For example, the performance may be reduced if the power management applied to the hard disk drive reduces performance during a period of time in which requests for access to that information is highest. The different illustrative embodiments recognize and take into account that it would be desirable to reduce the number of copies of data on different storage devices based on the type of power management being used by the storage device.

The different illustrative embodiments provide a method and apparatus for managing composite data in the network data processing system. A computer system identifies copies of a data object stored on a plurality of storage devices. The computer system selects a portion of the copies of the data object for removal from the plurality of storage devices based on the management of power for the plurality of storage devices. The computer system removes the portion of the copies of the data object from the plurality of storage devices.

Figure 3:
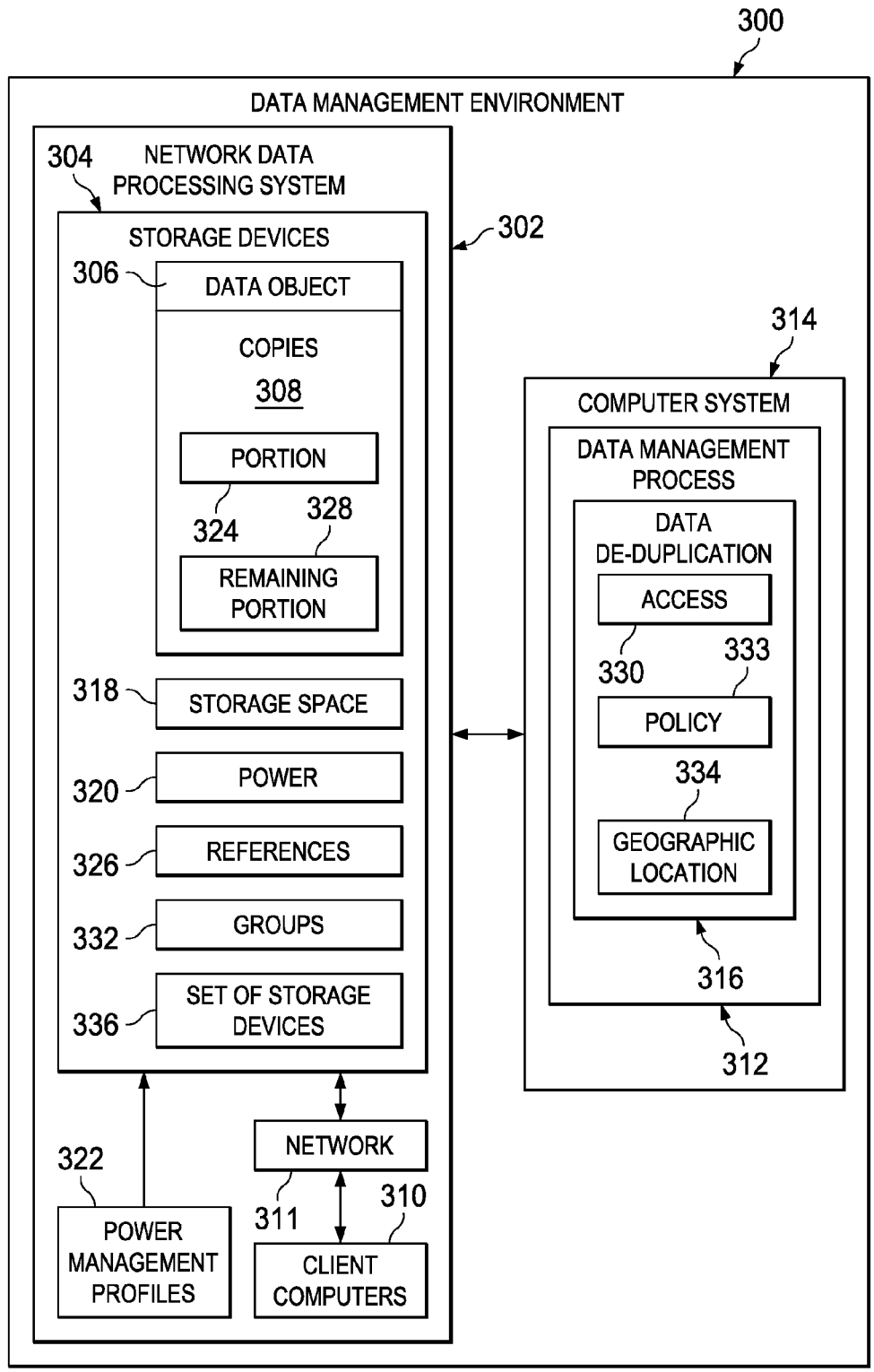
FIG. 3 is an illustration of a data management environment in accordance with an illustrative embodiment.

With reference now to FIG. 3, an illustration of a data management environment is depicted in accordance with an illustrative embodiment. In this depicted example, data management environment 300 includes network data processing system 302. Network data processing system 302 may be implemented using network data processing system 100 in FIG. 1. Storage devices 304 are present in network data processing system 302. A storage device is a hardware device that is configured to store data object 306. A storage device may be, for example, without limitation, a hard disk drive, a solid state drive, a redundant array of independent disks (RAID) array, a network attached storage (NAS) system, a storage area network (SAN) system, a shared memory, and other suitable types of hardware devices.

In these illustrative examples, copies 308 of data object 306 are stored on storage devices 304. These copies of data object 306 may be accessed by clients, such as client computers 310 via network 311 in network data processing system 302.

Data object 306 may take various forms. For example, a data object may be a file. The file may be, for example, a word processing document, a spreadsheet, program code, an image, a video, and/or some other suitable type of data. Additionally, in some illustrative embodiments, a data object may be a portion of a file; such as a document, a spreadsheet, or some other file.

In this illustrative example, data management process 312 executes on computer system 314. Data management process 312 may be implemented in program code run by computer system 314. In other illustrative examples, data management process 312 may be implemented in hardware in computer system 314. Computer system 314 is one or more computers in these examples. Data management process 312 may run on any computer in computer system 314 or may be distributed through computer system 314. In other words, data management process 312 may run on each computer in computer system 314, or different functions or portions of data management process 312 may run on different computers in computer system 314.

As depicted, data management process 312 manages copies 308 of data object 306. In particular, data management process 312 includes data de-duplication 316. In other words, data management process 312 reduces the number of copies 308 of data object 306 to increase storage space 318 in storage devices 304.

In these illustrative examples, data management process 312 performs data de-duplication 316 taking into account that power 320 for storage devices 304 is managed. For example, storage devices 304 have power management profiles 322. Power management profiles 322 are used to control the use of power 320 by storage devices 304. A power management profile includes information as to how different power management features in storage devices 304 may be controlled. For example, the power management includes a description of what times power use is to be reduced for a storage device. Additionally, a power management profile also specifies how the power usage is to be reduced. For example, the power management profile may state that between 2:00 a.m. and 5:00 a.m., the hard disk drive is to be turned off. In another example, the power management profile may state that between 2:00 a.m. and 5:00 a.m., the speed of the hard disk drive is to be reduced from the maximum speed for the hard disk drive.

Power management profiles 322 may be different for different storage devices within storage devices 304 in these depicted examples. The different advantageous embodiments recognize and take into account that the manner in which copies 308 of data object 306 are reduced may affect the performance in responding to requests from client computers 310 for data object 306.

Data management process 312 identifies copies 308 of data object 306 on storage devices 304. Data management process 312 selects portion 324 of copies 308 of data object 306 for removal from storage devices 304 based on management of power 320 for storage devices 304. In other words, data management process 312 takes into account the management of power for storage devices 304 using power management profiles 322. Data management process 312 removes portion 324 of copies 308 of data object 306 from storage devices 304.

In these illustrative examples, references 326 are placed into storage devices 304. References 326 are in locations in storage devices 304 where portion 324 of copies 308 of data object 306 are removed from storage devices 304. A reference is a pointer to a reference used to redirect any access requests from client computers 310 to a copy that is no longer present in a storage device. References 326 point to remaining portion 328 of copies 308 of data object 306. Remaining portion 328 of copies 308 of data object 306 may be one or more copies of data object 306. The amount of storage space used by references 326 is less than the storage space needed by portion 324 of copies 308 of data object 306 that are removed.

The selection of portion 324 is such that increases in time needed to respond to requests for data object 306 are reduced. In some illustrative examples, the selection of portion 324 to reduce increases in time to respond to requests may reduce time needed to respond to the requests as compared to the time needed before portion 324 of copies 308 are removed.

In these illustrative examples, data management process 312 predicts access 330 to data object 306 as part of a process for identifying portion 324 of copies 308 of data object 306. Access 330 may be predicted through the use of historical data identifying prior access to data object 306. In this illustrative example, access 330 provides an indication of how many requests for access to data object 306 to which the storage devices can respond.

With the prediction of access 330, data management process 312 selects a set of copies 308 of data object 306 on a set of storage devices 304 to form portion 324. In other words, data management process 312 selects set of copies 308 of data object 306 on set of storage devices 304 such that set of storage devices 304 have less or no reduction in the ability of the storage devices to respond to requests to access data because of a reduction of power usage.

One manner in which data management process 312 may select portion 324 of copies 308 of data object 306 is by grouping storage devices 304 into groups 332. The grouping is made using policy 333 in these examples. Policy 333 may include, for example, a number of rules for grouping storage devices 304 into groups 332. As one illustrative example, policy 333 includes a number of rules for selecting groups 332 based on power management profiles 322 and access 330 for storage devices 304.

A group in groups 332 may have a profile for power usage and access 330 within a threshold identified using policy 333. In other words, a group in groups 332 may have a power management profile and a capability to respond to a number of requests for access to copies 308 of data object 306 within a threshold identified using policy 333. This threshold may be, for example, a maximum number of requests that a particular storage device in storage devices 304 can handle based on a queue depth for the particular storage device. The queue depth is the number of requests that can be put into a queue for the storage device. Data management process 312 may select copies 308 of data object 306 in groups 332 such that a set of remaining copies of data object 306 is sufficient to reduce time needed to responding to requests for data object 306 based on access 330 predicted for copies 308 of data object 306.

In addition, data management process 312 also may take into account geographic location 334 in selecting portion 324 of copies 308 of data object 306. Geographic location 334 is an identification of the geographic location for each storage device in storage devices 304 in these examples.

Further, data management process 312 also may move remaining portion 328 of copies 308 of data object 306 to different storage devices in storage devices 304 or to set of storage devices 336. The movement of remaining portion 328 of copies 308 of data object 306 may be performed to increase or avoid a reduction in the time in which requests for data object 306 can be performed. For example, set of storage devices 336 may include one or more storage devices that have power management profiles that provide for quicker access to data object 306 for a predicted access 330 of data object 306.

Thus, the different illustrative embodiments provide an improved method and apparatus for managing data. In particular, one or more of the illustrative embodiments remove copies of data based on the management of power for storage devices on which those copies are located. The copies are removed in a manner that reduces the impact on performance in accessing the data.

The illustration of data management environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, data management process 312 may include other functions in addition to data de-duplication 316. For example, data management process 312 also may back up data object 306, respond to requests for data object 306 from client computers 310, and other suitable functions. In addition, computer system 314 may be part of network data processing system 302 or may be connected to network data processing system 302.

Figure 4:
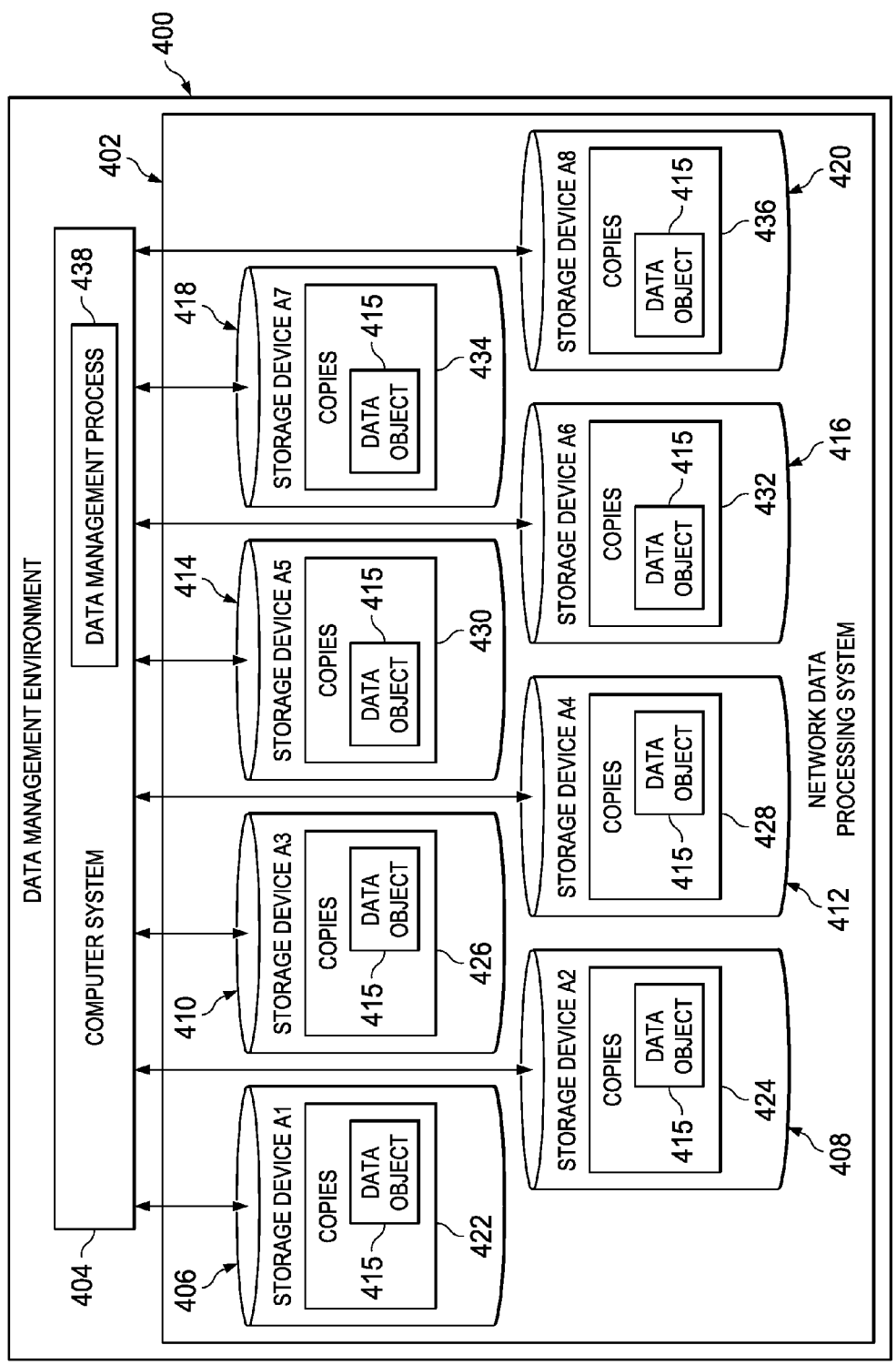
FIG. 4 is an illustration of a data management environment in accordance with an illustrative embodiment.

With reference now to FIG. 4, an illustration of a data management environment is depicted in accordance with an illustrative embodiment. In this illustrative example, data management environment 300 from FIG. 3 is depicted with network data processing system 302 and computer system 314 from FIG. 3. As depicted, network data processing system 302 includes storage devices A1 406, A2 408, A3 410, A4 412, A5 414, A6 416, A7 418, and A8 420. These storage devices are examples of storage devices in storage devices 304 in FIG. 3. In this illustrative example, these storage devices are located in different geographic locations.

For example, storage device A1 406 is located in China. Storage device A2 408 is located in Japan, while storage device A3 410 is located in Germany. Storage device A4 412 is located in the United States of America. Storage device A5 414 is located in France. Storage device A6 416 is located in Brazil, storage device A7 418 is located in Russia, and storage device A8 420 is located in Spain.

Each of the storage devices in network data processing system 302 holds copies of data object 415. For example, storage devices A1 406, A2 408, A3 410, A4 412, A5 414, A6 416, A7 418, and A8 420 hold copies 422, 424, 426, 428, 430, 432, 434, and 436, respectively, of data object 415. These copies of data object 415 are managed by data management process 312 running on computer system 314.

With reference now to FIG. 5, an illustration of a table identifying power management profiles and predicting access for storage devices is depicted in accordance with an illustrative embodiment. In this illustrative example, table 500 includes storage devices 502, power management profile identifiers 504, and requests 506.

Storage devices 502 correspond to storage devices A1 406, A2 408, A3 410, A4 412, A5 414, A6 416, A7 418, and A8 420 in FIG. 4. Power management profile identifiers 504 correspond to particular power management profiles for the storage devices.

In this illustrative example, requests 506 identifies the predicted number of requests for access to data object 415 in FIG. 4 to which each storage device in storage devices 502 can respond. In particular, requests 506 identifies the predicted number of requests for access to the copies of data object 415 to which the storage devices can provide access. Further, in this illustrative example, these copies are all the copies of data object 415 held in storage devices A1 406, A2 408, A3 410, A4 412, A5 414, A6 416, A7 418, and A8 420 prior to any data de-duplication. In other words, the values identified in requests 506 are predicted based on historical data about requests for access to the data held in the storage devices.

In this particular example, requests 506 are in the millions. For example, a value of 10 in requests 506 for storage device A1 corresponds to 10 million requests. In other words, storage device A1 is predicted to have the capability to respond to 10 million requests for access to the copies of data object 415 in FIG. 4.

With reference now to FIG. 6, an illustration of a table identifying power management profile identifiers for different power management profiles is depicted in accordance with an illustrative embodiment. In this illustrative example, table 600 includes power management profile identifiers 602 and power management profile codes 604.

In this illustrative example, power management profile codes 604 are for particular power management profiles. For example, each power management profile code has three positions. These three positions correspond to three periods of time in a day. For example, power management profile code 606 has first position 608, second position 610, and third position 612. First position 608 is for the first eight hours in a day from 0:00 GMT Greenwich Mean Time (GMT) to 8:00 Greenwich Mean Time. Second position 610 is for the middle eight hours in a day from 8:00 Greenwich Mean Time to 16:00 Greenwich Mean Time. Third position 612 is for the last eight hours in a day from 16:00 Greenwich Mean Time to 24:00 Greenwich Mean Time.

In this depicted example, a value of "1" in any of the three positions in the power management profile code indicates a normal power mode for the corresponding period of time. A value of "0" in any of the three positions in the power management profile code indicates a low power mode for the corresponding period of time. In this manner, each power management profile code identifies a power management profile. Further, each power management profile code in power management profile codes 604 is identified by a power management profile identifier in power management profile identifiers 602. In this manner, the power management profile identifiers correspond to particular power management profiles.

Additionally, power management profile code 614 has a value of "0" for the first position, second position, and third position in power management profile codes 604. These "0" values indicate that the power management profile uses a low power mode throughout the 24 hours in a day.

Figures 7, 8:
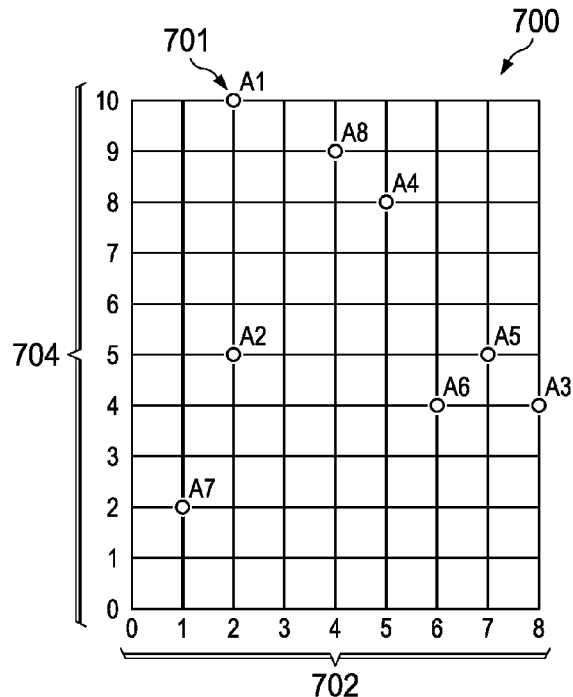
FIG. 7 is an illustration of a grid in which storage devices are identified in locations on the grid in accordance with an illustrative embodiment.
FIG. 8 is an illustration of a table assigning storage devices to groups in accordance with an illustrative embodiment.

With reference now to FIG. 7, an illustration of locations for storage devices on a grid is depicted in accordance with an illustrative embodiment. In this illustrative example, grid 700 has x-axis 702 and y-axis 704. Storage devices A1 406, A2 408, A3 410, A4 412, A5 414, A6 416, A7 418, and A8 420 in FIG. 4 are identified as having locations 701 on grid 700 with respect to x-axis 702 and y-axis 704.

In this illustrative example, x-axis 702 corresponds to power management profile identifiers. Y-axis 704 corresponds to the number of requests for access to copies of data object 415 in FIG. 4 to which the storage devices are predicted as having the capability to respond. Further, the number of requests identified for y-axis 704 is in millions.

As depicted in this example, locations 701 for the storage devices are identified by an x-coordinate and a y-coordinate for each storage device. The x-coordinate for each storage device is the power management profile identifier identified in power management profile identifiers 504 in FIG. 5 for each storage device. The y-coordinate for each storage device is the number of requests identified in requests 506 in FIG. 5 for each storage device.

With reference now to FIG. 8, an illustration of a table used to assign storage devices to groups is depicted in accordance with an illustrative embodiment. In this illustrative example, table 800 includes storage devices 802, locations 804, first distance 806, second distance 808, third distance 810, and groups 812.

Storage devices 802 correspond to storage devices A1 406, A2 408, A3 410, A4 412, A5 414, A6 416, A7 418, and A8 420 in FIG. 4. Locations 804 identify the x-coordinate and y-coordinate locations for the storage devices. These locations correspond to locations 701 in FIG. 7.

Additionally, first distance 806 identifies a distance between a location in locations 804 and first selected location 814. Second distance 808 identifies a distance between a location in locations 804 and second selected location 816. Third distance 810 identifies a distance between a location in locations 804 and third selected location 818. First selected location 814, second selected location 816, and third selected location 818 are x-coordinate and y-coordinate locations selected from locations 804.

In addition, first selected location 814, second selected location 816, and third selected location 818 may be randomly selected from locations 804 in this illustrative example. Further, first selected location 814, second selected location 816, and third selected location 818 are selected as part of a grouping process used to group the storage devices. The grouping process used may be, for example, without limitation, the k-means algorithm, the k-nearest neighbors algorithm, or some other suitable type of process for grouping the storage devices. For example, first selected location 814, second selected location 816, and third selected location 818 correspond to a first group, a second group, and a third group for grouping the storage devices.

The values for first distance 806, second distance 808, and third distance 810 are identified using a distance function. This distance function is:

$$D=|x_2-x_1|+|y_2-y_1|$$

where D is the distance between a location of a storage device and a selected location, $x_2$ is the x-coordinate of the selected location, $x_1$ is the x-coordinate of the location of the storage device, $y_2$ is the y-coordinate of the selected location, and $y_1$ is the y-coordinate of the location of the storage device.

As depicted, for each storage device, the smallest distance for first distance 806, second distance 808, and third distance 810 is used to identify to which of the three groups to assign the storage device. For example, storage device A2 is assigned to the third group, because third distance 810 is the smallest distance for storage device A2. Groups 812 identify the group to which each of the storage devices is assigned.

Figure 9:
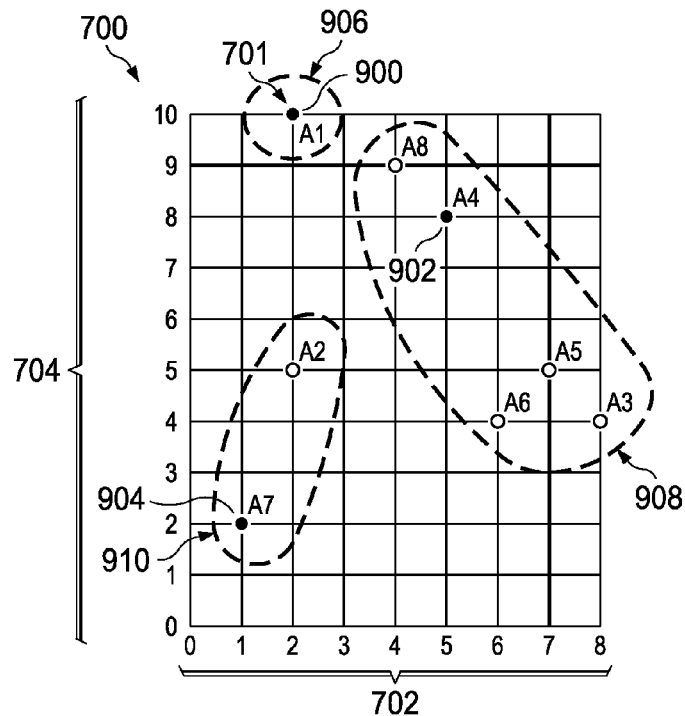
FIG. 9 is an illustration of groups of storage devices identified on a grid in accordance with an illustrative embodiment.

With reference now to FIG. 9, an illustration of groups of storage devices identified on a grid is depicted in accordance with an illustrative embodiment. In this illustrative example, location 900 for storage device A1 406 in FIG. 4, location 902 for storage device A4 412 in FIG. 4, and location 904 for storage device A7 418 in FIG. 4 are identified as being selected as first selected location 814, second selected location 816, and third selected location 818 in FIG. 8, respectively on grid 700. As depicted, a grouping process is used to select first group 906, second group 908, and third group 910 for the storage devices. This grouping process may be a process within, for example, data management process 312 in FIG. 3.

Figure 10:
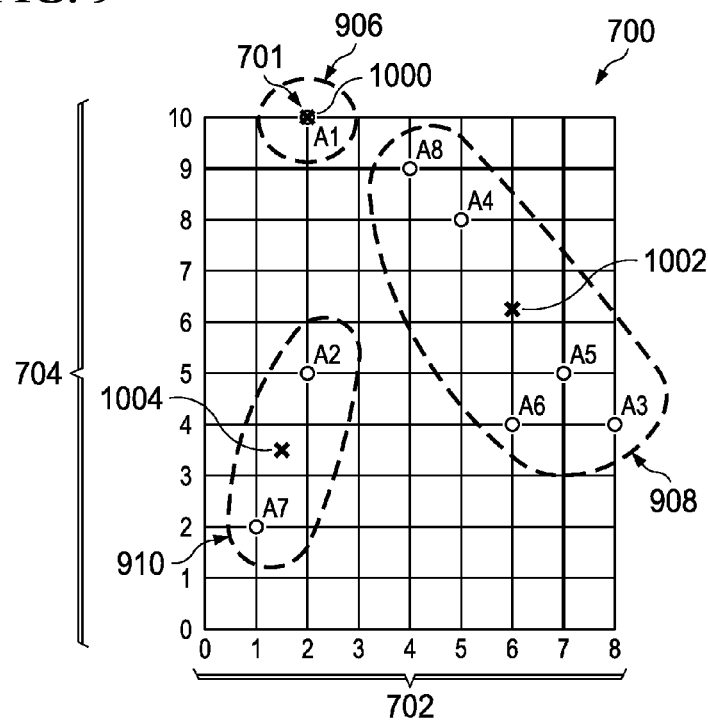
FIG. 10 is an illustration of centroids of groups of storage devices identified on a grid in accordance with an illustrative embodiment.

With reference now to FIG. 10, an illustration of centroids of groups of storage devices identified on a grid is depicted in accordance with an illustrative embodiment. In this illustrative example, centroid 1000, centroid 1002, and centroid 1004 are identified for first group 906, second group 908, and third group 910, respectively. Each of these three centroids has an x-coordinate and y-coordinate location. Centroid 1000, centroid 1002, and centroid 1004 are considered the center locations for first group 906, second group 908, and third group 910, respectively.

In this example, these three locations for centroid 1000, centroid 1002, and centroid 1004 are then selected as the first selected location, second selected location, and third selected location for the grouping process described above. In other words, a table similar to table 800 in FIG. 8 is generated for storage devices 802 in which values for first distance 806, second distance 808, and third distance 810 are identified based on the locations of centroid 1000, centroid 1002, and centroid 1004, respectively. Further, centroid 1000, centroid 1002, and centroid 1004 correspond to a new first group, a new second group, and a new third group to which to assign the storage devices in groups 812 using the distance function described above.

Figure 11:
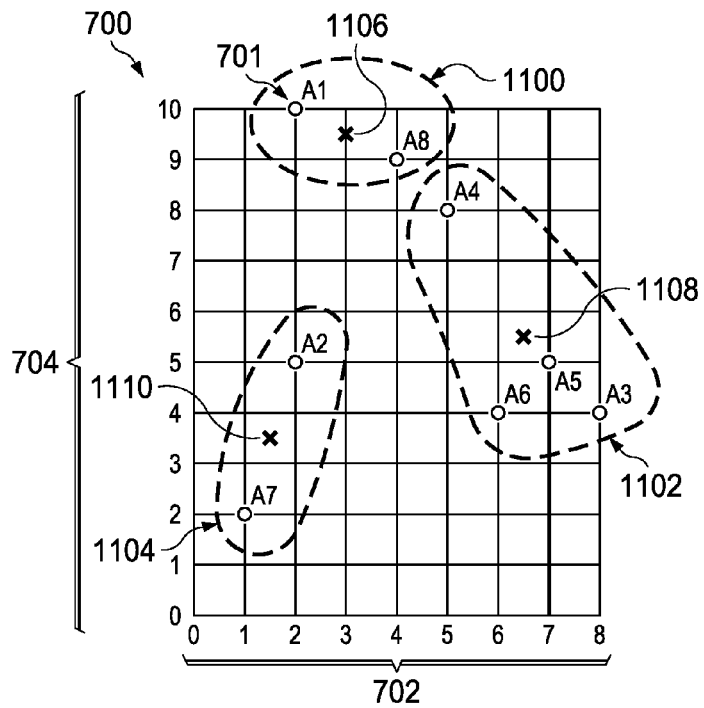
FIG. 11 is an illustration of new groups of storage devices in accordance with an illustrative embodiment.

With reference now to FIG. 11, an illustration of new groups of storage devices is depicted in accordance with an illustrative embodiment. In this illustrative example, the storage devices have been assigned to new groups based on the identification of centroid 1000, centroid 1002, and centroid 1004 in FIG. 10. As depicted, the storage devices have been grouped into new first group 1100, new second group 1102, and new third group 1104. New first group 1100 has centroid 1106, new second group 1102 has centroid 1108, and new third group 1104 has centroid 1110. Centroid 1106, centroid 1108, and centroid 1110 are the center locations for new first group 1100, new second group 1102, and new third group 1104, respectively.

The grouping process of grouping the storage devices based on previously identified centroids and identifying new centroids for the newly formed groups, as described above, may be repeated until the locations for the centroids identified for the groups of storage devices do not move on grid 700 within a selected tolerance.

Figure 12:
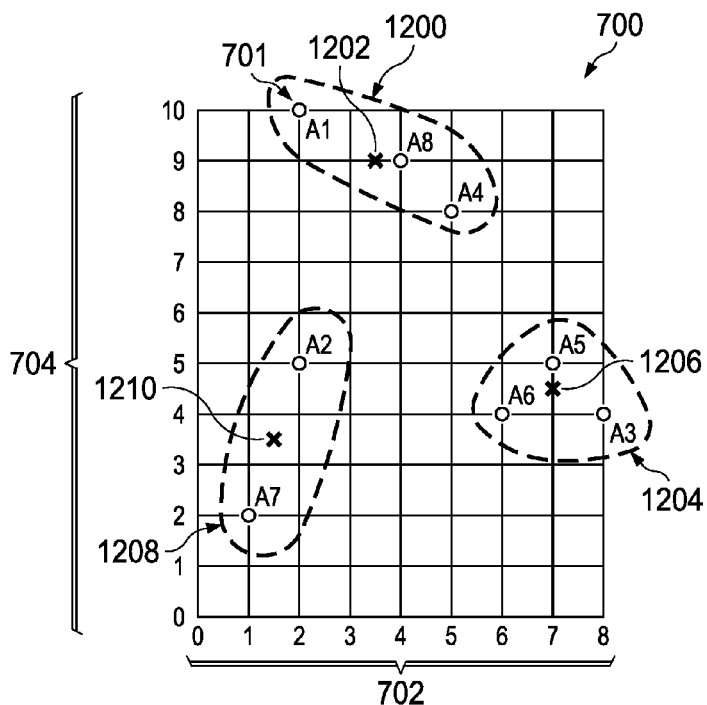
FIG. 12 is an illustration of groups of storage devices in accordance with an illustrative embodiment.

With reference now to FIG. 12, an illustration of groups of storage devices is depicted in accordance with an illustrative embodiment. In this illustrative example, the storage devices have been grouped into group 1200 with centroid 1202, group 1204 with centroid 1206, and group 1208 with centroid 1210. These groups may be the final result for the grouping process described above. Centroid 1202, centroid 1206, and centroid 1210 are the center locations for group 1200, group 1204, and group 1208, respectively.

Each storage device in a group in groups 1200, 1204, and 1208 has a smallest distance to the centroid corresponding to the group, as compared to the distance between the storage device and the centroids of the other groups. As one illustrative example, storage device A2 has the smallest distance to centroid 1210 as compared to centroid 1202 and centroid 1206. As a result, storage device A2 is grouped into group 1208 having centroid 1210.

Figure 13:
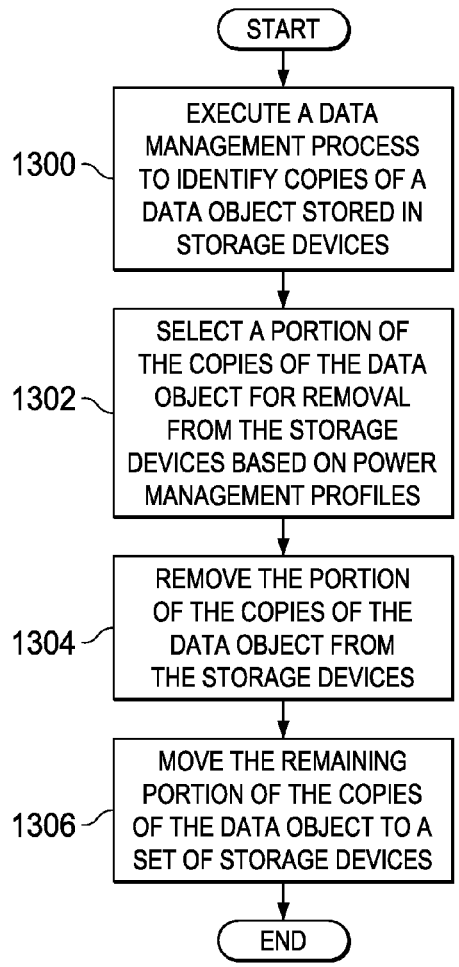
FIG. 13 is an illustration of a flowchart of a process for managing copies of data in the network data processing system in accordance with an illustrative embodiment.

With reference now to FIG. 13, an illustration of a flowchart of a process for managing copies of data in the network data processing system is depicted in accordance with an illustrative embodiment. The process illustrated in FIG. 13 may be implemented in data management process 312 executing on client computers 310 in FIG. 3. This process may be implemented in program code for data management process 312. The program code may be run by one or more processor units in computer system 314 in FIG. 3.

Computer system 314 begins executing data management process 312 to identify copies 308 of data object 306 stored in storage devices 304 (step 1300). Computer system 314 then selects portion 324 of copies 308 of data object 306 for removal from storage devices 304 based on power management profiles 322 (step 1302). Step 1302 may be performed to reduce time needed to access copies 308 that are not removed. Thereafter, computer system 314 removes portion 324 of copies 308 of data object 306 from storage devices 304 (step 1304).

Computer system 314 then moves remaining portion 328 of copies 308 of data object 306 to set of storage devices 336 (step 1306), with the process terminating thereafter. Set of storage devices 336 may be within storage devices 304 or different storage devices from storage devices 304. In these illustrative examples, step 1304 is an optional step and may be used to further increase the performance in responding to requests for data object 306.

Figure 14:
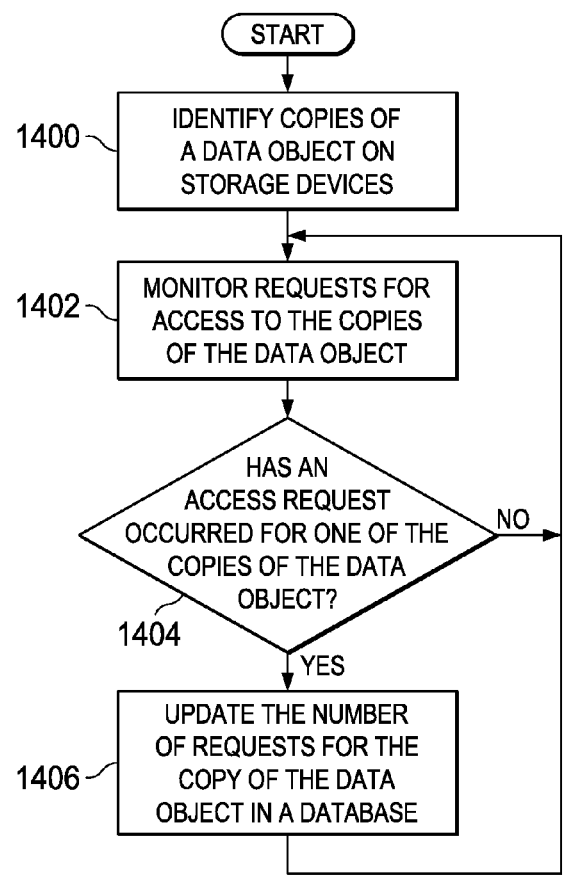
FIG. 14 is an illustration of a flowchart of a process for managing copies of data in accordance with an illustrative embodiment.

With reference now to FIG. 14, an illustration of a flowchart of a process for managing copies of data is depicted in accordance with an illustrative embodiment. The process illustrated in FIG. 14 may be implemented to perform data de-duplication 316 in FIG. 3. This process may be implemented in program code for data management process 312 in FIG. 3. This program code may be run by one or more processor units in computer system 314.

Data management process 312 begins by identifying copies 308 of data object 306 on storage devices 304 (step 1400). Data management process 312 then monitors requests for access to copies 308 of data object 306 (step 1402). Data management process 312 determines whether an access request has occurred for one of copies 308 of data object 306 (step 1404). If an access request is present, data management process 312 updates the number of requests for the copy of data object 306 in a database (step 1406). Data management process 312 then returns to step 1402.

With reference again to step 1404, if an access request is not present, data management process 312 also returns to step 1402. The number of access requests for copies 308 of data object 306 may be used to predict access for copies 308 of data object 306.

Figures 15, 16:
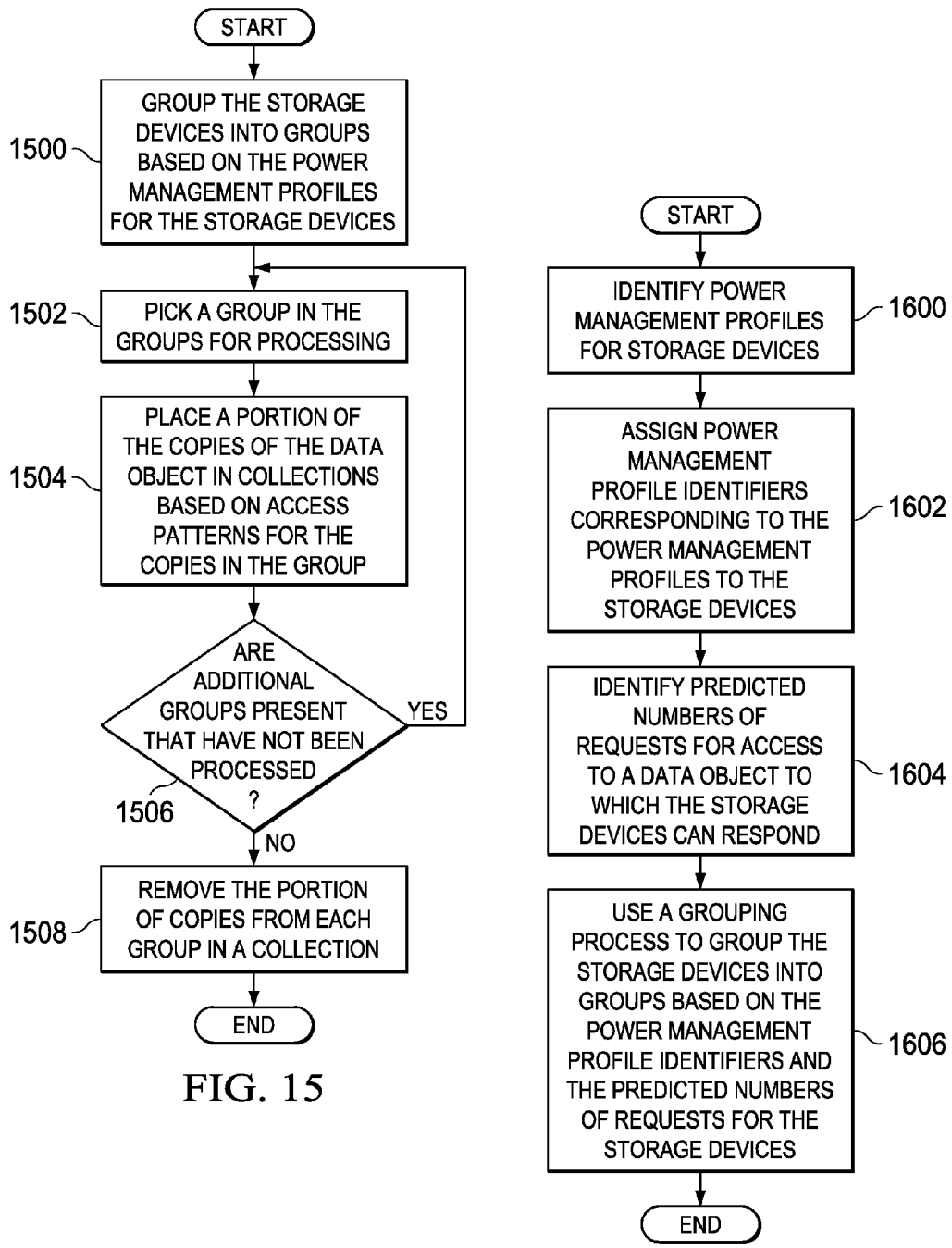
FIG. 15 is an illustration of a flowchart of a process for selecting data objects for removal in accordance with an illustrative embodiment.
FIG. 16 is an illustration of a flowchart of a process for grouping storage devices in accordance with an illustrative embodiment.

With reference to FIG. 15, an illustration of a flowchart of a process for selecting data objects for removal is depicted in accordance with an illustrative embodiment. The process illustrated in FIG. 15 is an example of one implementation for step 1300 in FIG. 13.

Data management process 312 begins by grouping storage devices 304 into groups 332 based on power management profiles 322 for storage devices 304 (step 1500). For example, storage devices 304 may be grouped into groups 332 based on power management profiles 322 that have similar sets of power management profile codes 604 as a function of time of day. As one illustrative example, storage devices 304 may have one of two power management profiles. The first power management profile indicates a high power mode from 8:00 a.m. to 5:00 p.m. EST, and a low power mode from 5:01 p.m. to 7:59 a.m. EST. The second power management profile indicates a high power mode from 2:00 a.m. to 11:00 a.m. EST, and a low power mode from 11:01 a.m. to 1:59 a.m. EST.

In this illustrative example, storage devices having a high power mode from 8:00 a.m. to 5:00 p.m. EST and a low power mode from 5:01 p.m. to 7:59 a.m. EST are grouped together in a first group to determine which copies to remove. All storage devices having a high power mode from 2:00 a.m. to 11:00 a.m. EST and a low power mode from 11:01 a.m. to 1:59 a.m. EST are grouped together in a second group. In this manner, data management process 312 forms two groups based on the power management profiles.

Thereafter, data management process 312 picks a group in groups 332 for processing (step 1502). Data management process 312 then places portion 324 of copies 308 of data object 306 in collections based on access patterns for the copies in the group (step 1504).

Data management process 312 determines whether additional groups are present that have not been processed (step 1506). If groups are present that have not been processed, data management process 312 returns to step 1502. Otherwise, data management process 312 removes portion 324 of copies 308 from each group in a collection (step 1508) such that at least one copy of data object 306 is present in each group in these examples, with the process terminating thereafter.

In this illustrative example, data management process 312 places the copies in collections to reduce the number of copies in each group. The number of copies in each group is reduced such that the set of storage devices in the group having the remaining copies can handle the number of concurrent requests that have historically been made per time of day per power mode. For example, if the highest number of concurrent requests for a copy in high power mode between 8:00 a.m. EST and 5:00 p.m. EST is 100 concurrent requests, the system retains the number of copies in the storage devices in the first group needed to concurrently handle at least about 100 requests and having sufficient bandwidth.

With reference now to FIG. 16, an illustration of a flowchart of a process for grouping storage devices is depicted in accordance with an illustrative embodiment. The process illustrated in FIG. 16 is an example of one implementation for step 1500 in FIG. 15. The process illustrated in FIG. 16 may be implemented in data management process 312 executing on client computers 310 in FIG. 3. This process may be implemented in program code for data management process 312. The program code may be run by one or more processor units in computer system 314 in FIG. 3.

Data management process 312 begins by identifying power management profiles 322 for storage devices 304 (step 1600). Data management process 312 then assigns power management profile identifiers corresponding to power management profiles 322 to storage devices 304 (step 1602). The power management profile identifiers may be, for example, power management profile identifiers 504 identified for storage devices 502 in FIG. 5.

Thereafter, data management process 312 identifies the predicted numbers of requests for access to data object 306 to which storage devices 304 can respond (step 1604). These predicted numbers of requests may be, for example, requests 506 identified for storage devices 502 in FIG. 5.

Next, data management process 312 uses a grouping process to group storage devices 304 into groups 332 based on the power management profile identifiers and the predicted numbers of requests for storage devices 304 (step 1606), with the process terminating thereafter. Step 1606 may be performed using a grouping process, such as, for example, without limitation, a k-means algorithm, a k-nearest neighbors algorithm, and/or some other suitable type of grouping process. This grouping process may also be referred to as a clustering process. In step 1606, groups 332 may be also selected using policy 333. Policy 333 may include a number of rules for selecting groups 332.

Figure 17:
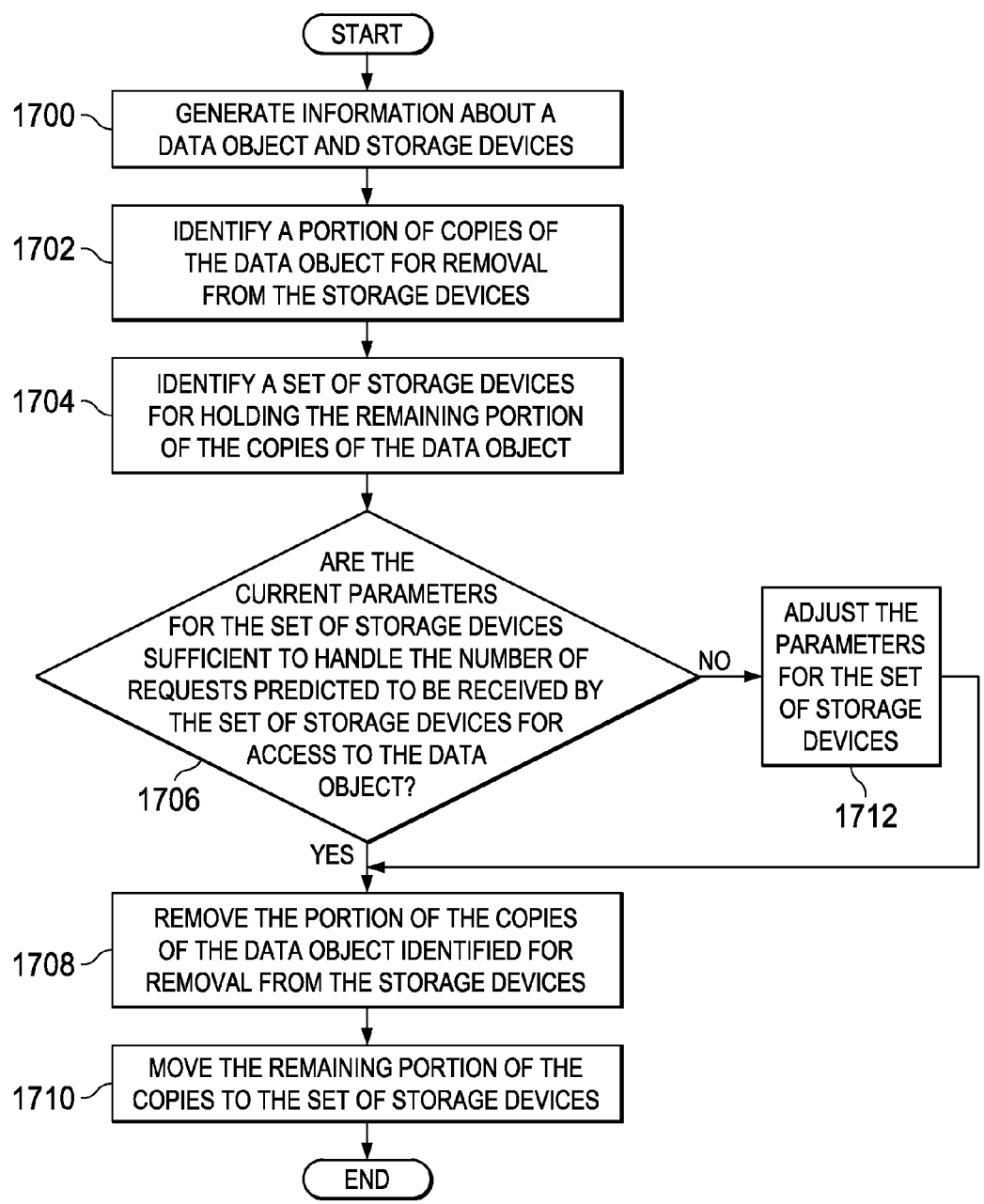
FIG. 17 is an illustration of a flowchart of a process for managing copies of data held in storage devices in accordance with an illustrative embodiment.

With reference now to FIG. 17, an illustration of a flowchart of a process for managing copies of data held in storage devices is depicted in accordance with an illustrative embodiment. The process illustrated in FIG. 17 may be implemented in data management process 312 executing on client computers 310 in FIG. 3. This process may be implemented in program code for data management process 312. The program code may be run by one or more processor units in computer system 314 in FIG. 3.

Data management process 312 generates information about data object 306 and storage devices 304 (step 1700). This information includes, for example, without limitation, the number of copies 308 for data object 306 on storage devices 304, the number of requests for access to data object 306 received at storage devices 304, and/or other suitable information about data object 306 and storage devices 304. Other types of information may include, for example, characteristics of storage devices 304. These characteristics may include, for example, a queue depth for each storage device, the maximum number of concurrent requests that can be handled by each storage device, and/or other suitable types of characteristics. In these illustrative examples, concurrent requests are requests that are present for handling at the same time. Concurrent requests do not have to be received at the same time.

Data management process 312 then identifies portion 324 of copies 308 of data object 306 for removal from storage devices 304 (step 1702). Next, data management process 312 identifies set of storage devices 336 that will hold remaining portion 328 of copies 308 of data object 306 (step 1704).

Data management process 312 then determines whether the current parameters for set of storage devices 336 are sufficient to handle the number of requests predicted to be received by set of storage devices 336 for access to data object 306 (step 1706). The parameters may include, for example, without limitation, the power management profiles for set of storage devices 336, the maximum number of concurrent requests that can be handled by set of storage devices 336, the maximum number of requests that can be put in queue, and/or other suitable parameters.

If the current parameters for set of storage devices 336 are sufficient, data management process 312 removes portion 324 of copies 308 of data object 306 identified for removal from storage devices 304 (step 1708). Step 1708 may be performed by data de-duplication 316 in FIG. 3. Data management process 312 then moves remaining portion 328 of copies 308 to set of storage devices 336 (step 1710), with the process terminating thereafter.

With reference again to step 1706, if the current parameters for set of storage devices 336 are not sufficient, data management process 312 adjusts the parameters for set of storage devices 336 (step 1712), with the process then proceeding to step 1708 as described above.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer readable medium providing program code for use by or in connection with a computer or any instruction system.

The computer readable storage device can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing copies of data objects in a network data processing system, the method comprising:
    a computer system identifying copies of a data object stored on a plurality of storage devices;
    the computer system determining (a) numbers of requests for access to the data object for which the respective storage devices have respective capabilities to respond and (b) an identification of parameters for power use of the respective storage devices as a function of time of day;
    the computer system grouping the plurality of storage devices into respective groups such that substantially all of the storage devices in each of the groups have a smaller geographic distance to a geographic center of their group than a distance to geographic centers of other of the groups, wherein the grouping is repeated until a center of each group does not change within a selected tolerance, and the center of each group is identified from the parameters for power use of each storage device in each of the groups;
    the computer system selecting for removal the copies of the data object from one or more of the storage devices in each of the groups such that other storage devices in said each of the groups are capable of handling a historical number of concurrent requests that have been made as a function of time of day for the copies of the data object from a geographic region served by the respective group; and
    the computer system removing the copies of the data object selected for removal from the one or more storage devices.

2. The method of claim 1 further comprising:
    the computer system assigning references to the one or more storage devices to other copies of the data object not selected for removal; and
    the computer system using the references to redirect access requests for the data object to the other copies of the data object not selected for removal.

3. The method of claim 1, wherein the computer system selecting for removal the copies of the data object from the one or more of the storage devices in each of the groups such that other storage devices in said each of the groups are capable of handling the historical number of concurrent requests that have been made as a function of time of day-for the copies of the data object from the geographic region served by the respective group further comprises:

the computer system predicting access to the copies of the data object on the plurality of storage devices; and the computer system selecting for removal the copies of the data object from the one or more of the storage devices in each of the groups to reduce time for responding to requests for the data object.

4. The method of claim 3, wherein the computer system selecting for removal the copies of the data object from the one or more of the storage devices in each of the groups to reduce the time for responding to the requests for the data object comprises:

the computer system identifying a group of storage devices in which the identified parameters for power use of each respective storage device in the group does not reduce performance when access to the data object is predicted to occur; and the computer system selecting for removal the copies of the data object from the one or more of the storage devices in each of the groups to reduce the time for responding to the requests for the data object, wherein the one or more of the storage devices is outside of the group of storage devices.

5. The method of claim 1, wherein the computer system grouping the plurality of storage devices into the respective groups such that substantially all of the storage devices in each of the groups have the smaller geographic distance to the geographic center of their group than the distance to the geographic centers of the other of the groups, wherein the grouping is repeated until a center of each group does not change within a selected tolerance, and the center of each group is identified from the parameters for power use of each storage device in each of the groups, further comprises:

the computer system identifying geographic locations of the storage devices from identified numbers of requests for access to the data object for which the respective storage device has respective capabilities to respond and the identified parameters for power use of each respective storage device;

the computer system identifying the geographic center of each group from identified geographic locations of the respective storage devices in each group; and the computer system grouping the plurality of storage devices into the respective groups using a policy for grouping the plurality of storage devices into the respective groups such that substantially all of the storage devices in each of the groups have a smaller geographic distance from their geographic location to the geographic center of their group than the distance to the geographic centers of the other of the groups.

6. The method of claim 5, wherein the computer system selecting for removal the copies of the data object from the one or more of the storage devices in each of the groups such that other storage devices in said each of the groups are capable of handling the historical number of concurrent requests that have been made as a function of time of day for the copies of the data object from the geographic region served by the respective group further comprises:

the computer system selecting for removal the copies of the data object from the one or more of the storage devices in each of the groups such that the other storage devices are sufficient to reduce time for responding to requests for the data object based on access predicted to the copies of the data object.

7. The method of claim 6, wherein the computer system selecting for removal the copies of the data object from the one or more of the storage devices in each of groups such that other storage devices are sufficient to reduce the time for responding to the requests for the data object based on the access predicted to the copies of the data object further comprises:

the computer system placing the copies of the data object in the each of the groups into collections based on access patterns; and the computer system selecting a copy of the data object in each collection to be in a set of remaining copies of the data object located in the other storage devices sufficient to reduce the time for responding to the requests for the data object based on the access predicted to the copies of the data object.

8. The method of claim 1, wherein the computer system selecting for removal the copies of the data object from the one or more of the storage devices in each of the groups such that other storage devices in said each of the groups are capable of handling the historical number of concurrent requests that have been made as a function of time of day-for the copies of the data object from the geographic region served by the respective group further comprises:

the computer system selecting for removal the copies of the data object from the one or more of the storage devices in each of the groups such that a remaining set of the copies of the data object has an access pattern that matches the identification of the parameters for power use of the respective storage devices of the other storage devices sufficient to reduce time for responding to requests for the data object.

9. The method of claim 1 further comprising:

the computer system moving a remaining set of the copies of the data object to different storage devices in the plurality of storage devices based on the identification of the parameters for power use of the respective storage devices to reduce or increase time for responding to requests for the data object.

10. A computer system for managing copies of data objects in a network data processing system, the computer system comprising:

a CPU, a computer-readable tangible storage device, and a computer-readable memory;

first program instructions to identify copies of a data object stored on a plurality of storage devices;

second program instructions to determine (a) numbers of requests for access to the data object for which the respective storage devices have respective capabilities to respond and (b) an identification of parameters for power use of the respective storage devices as a function of time of day;

third program instructions to group the plurality of storage devices into respective groups such that substantially all of the storage devices in each of the groups have a smaller geographic distance to a geographic center of their group than a distance to geographic centers of other of the groups, wherein the grouping is repeated until a center of each group does not change within a selected tolerance, and the center of each group is identified from the parameters for power use of each storage device in each of the groups;

fourth program instructions to select for removal the copies of the data object from one or more of the storage devices in each of the groups such that other storage devices in each of the groups are capable of handling a historical number of concurrent requests that have been made as a function of time of day for the copies of the data object from a geographic region served by the respective group; and fifth program instructions to remove the copies of the data object selected for removal from the one or more storage devices, wherein the first, second, third, fourth, and fifth program instructions are stored on the computer-readable tangible storage device for execution by the CPU via the computer-readable memory.

11. The computer system of claim 10 further comprising:
sixth program instructions to assign references to the one or more storage devices to other copies of the data object not selected for removal; and seventh program instructions to use the references to redirect access requests for the data object to the other copies of the data object not selected for removal, wherein the sixth program instructions and seventh program instructions are stored on the computer-readable tangible storage device for execution by the CPU via the computer-readable memory.

12. The computer system of claim 10, wherein the fourth program instructions to select for removal the copies of the data object from the one or more of the storage devices in each of the groups such that other storage devices in said each of the groups are capable of handling the historical number of concurrent requests that have been made as a function of time of day for the copies of the data object from the geographic region served by the respective group comprises:

program instructions to predict access to the copies of the data object on the plurality of storage devices; and program instructions to select for removal the copies of the data object from the one or more of the storage devices in each of the groups to reduce time for responding to requests for the data object.

13. The computer system of claim 12, wherein the fourth program instructions to select for removal the copies of the data object from the one or more of the storage devices in each of the groups to reduce the time for responding to the requests for the data object comprises:

program instructions to identify a group of storage devices in which the identified parameters for power use of each respective storage device in the group of storage devices does not reduce performance when access to the data object is predicted to occur; and program instructions to select for removal the copies of the data object from the one or more of the storage devices in each of the groups to reduce the time for responding to the requests for the data object, wherein the one or more of the storage devices is outside of the group of storage devices.

14. The computer system of claim 10, wherein the third program instructions to group the respective storage devices into a plurality of groups such that substantially all of the storage devices in each of the groups have the smaller geographic distance to the geographic center of their group than a distance to the geographic centers of the other of the groups, wherein the grouping is repeated until a center of each group does not change within a selected tolerance, and the center of each group is identified from the parameters for power use of each storage device in each of the groups comprises:

program instructions to identify geographic locations of the storage devices from identified numbers of requests for access to the data object for which the respective storage device has respective capabilities to respond and the identified parameters for power use of each respective storage device;

program instructions to identify the geographic center of each group from identified geographic locations of the respective storage devices in each group; and program instructions to group the plurality of storage devices into the respective groups using a policy for grouping the plurality of storage devices into the respective groups such that substantially all of the storage devices in each of the groups have a smaller geographic distance from their geographic location to the geographic center of their group than the distance to the geographic centers of the other of the groups; and wherein the fourth program instructions to select for removal the copies of the data object from the one or more of the storage devices in each of the groups such that other storage devices in each of the groups are capable of handling the historical number of concurrent requests that have been made for the copies of the data object from the geographic region served by the respective group comprises:

program instructions to select for removal the copies of the data object from the one or more of the storage devices in each of the groups such that the other storage devices are sufficient to reduce time for responding to requests for the data object based on access predicted to the copies of the data object.

15. The computer system of claim 14, wherein the program instructions to select for removal the copies of the data object from the one or more of the storage devices in each of the groups such that other storage devices are sufficient to reduce the time for responding to the requests for the data object based on the access predicted to the copies of the data object comprises:

program instructions to place the copies of the data object in the each of a plurality of groups into collections based on access patterns; and program instructions to select a copy of the data object in each collection to be in a set of remaining copies of the data object located in the other storage devices sufficient to reduce the time for responding to the requests for the data object based on the access predicted to the copies of the data object.

16. The computer system of claim 10, wherein the fourth program instructions to select for removal the copies of the data object from the one or more of the storage devices in each of the groups such that other storage devices in said each of the groups are capable of handling the historical number of concurrent requests that have been made as a function of time of day for the copies of the data object from the geographic region served by the respective group comprises:

program instructions to select for removal the copies of the data object from the one or more of the storage devices in each of the groups such that a remaining set of the copies of the data object has an access pattern that matches the identification of the parameters for power use of the respective storage devices of the other storage devices sufficient to reduce time for responding to requests for the data object.

17. The computer system of claim 10 further comprising:
sixth program instructions to move a remaining set of the copies of the data object to different storage devices in the plurality of storage devices based on the identification of the parameters for power use of the respective storage devices to reduce or increase time for responding to requests for the data object, wherein the sixth program instructions are stored on the computer-readable tangible storage device for execution by the CPU via the computer-readable memory.

18. A computer program product for managing copies of data objects in a network data processing system, the computer program product comprising:
one or more computer-readable tangible storage devices and program code stored on at least one of the one or more storage devices, the program code comprising:
program code for identifying copies of a data object stored on a plurality of storage devices;
program code for identifying numbers of requests for access to the data object for which the respective storage devices have respective capabilities to respond and an identification of parameters for power use of the respective storage devices as a function of time of day;
program code for grouping the plurality of storage devices into respective groups such that substantially all of the storage devices in each of the groups have a smaller geographic distance to a geographic center of their group than a distance to geographic centers of other of the groups, wherein the grouping is repeated until a center of each group does not change within a selected tolerance, and the center of each group is identified from the parameters for power use of each storage device in each of the groups;
program code for selecting for removal the copies of the data object from one or more of the storage devices in each of the groups such that other storage devices in said each of the groups are capable of handling a historical number of concurrent requests that have been made as a function of time of day for the copies of the data object from a geographic region served by the respective group; and
program code for removing the copies of the data object selected for removal from the one or more storage devices.

19. The computer program product of claim 18, further comprising:
program code, stored on the one or more computer-readable tangible storage devices, for assigning references to the one or more storage devices to other copies of the data object not selected for removal; and
program code, stored on the one or more computer-readable tangible storage devices, for using the reference to redirect access requests for the data object to another copy of the data object.

20. The computer program product of claim 18, wherein the program code for selecting for removal the copies of the data object from the one or more of the storage devices in each of the groups such that other storage devices in said each of the groups are capable of handling the historical number of concurrent requests that have been made as a function of time of day for the copies of the data object from the geographic region served by the respective group further comprises:
program code, stored on the one or more computer-readable tangible storage devices, for predicting access to the copies of the data object on the plurality of storage devices; and
program code, stored on the one or more computer-readable tangible storage devices, for selecting for removal the copies of the data object from the one or more of the storage devices in each of the groups to reduce time for responding to requests for the data object.

21. The computer program product of claim 20, wherein the program code for selecting for removal the copies of the data object from the one or more of the storage devices in each of the groups to reduce the time for responding to the requests for the data object further comprises:
program code, stored on the one or more computer-readable tangible storage devices, for identifying a group of storage devices in which the identified parameters for power use of each respective storage device in the group does not reduce performance when access to the data object is predicted to occur; and
program code, stored on the one or more computer-readable tangible storage devices, for selecting for removal the copies of the data object from the one or more of the storage devices in each of the groups to reduce the time for responding to the requests for the data object, wherein the one or more of the storage devices is outside of the group of storage devices.

22. The computer program product of claim 18, wherein the program code for grouping the plurality of storage devices into the respective groups such that substantially all of the storage devices in each of the groups have the smaller geographic distance to the geographic center of their group than the distance to the geographic centers of the other of the groups, wherein the grouping is repeated until a center of each group does not change within a selected tolerance, and the center of each group is identified from the parameters for power use of each storage device in each of the groups further comprises:
program code, stored on the one or more computer-readable tangible storage devices, for identifying geographic locations of the storage devices from identified numbers of requests for access to the data object for which the respective storage device has respective capabilities to respond and the identified parameters for power use of each respective storage device;
program code, stored on the one or more computer-readable tangible storage devices, for identifying the geographic center of each group from identified geographic locations of the respective storage devices in each group; and
program code, stored on the one or more computer-readable tangible storage devices, for grouping the plurality of storage devices into the respective groups using a policy for grouping the plurality of storage devices into the respective groups such that substantially all of the storage devices in each of the groups have a smaller geographic distance from their geographic location to the geographic center of their group than the distance to the geographic centers of the other of the groups.

23. The computer program product of claim 22, wherein the program code for selecting for removal the copies of the data object from the one or more of the storage devices in each of the groups such that other storage devices in said each of the groups are capable of handling the historical number of concurrent requests that have been made as a function of time of day for the copies of the data object from the geographic region served by the respective group further comprises:
program code, stored on the one or more computer-readable tangible storage devices, for selecting for removal the copies of the data object from the one or more of the storage devices in each of the groups such that the other storage devices are sufficient to reduce time for responding to requests for the data object based on access predicted to the copies of the data object.

24. The computer program product of claim 23, wherein the program code for selecting for removal the copies of the data object from the one or more of the storage devices in each of the groups such that other storage devices are sufficient to reduce the time for responding to the requests for the data object based on the access predicted to the copies of the data object further comprises:

program code, stored on the one or more computer-readable tangible storage devices, for placing the copies of the data object in the each of the groups into collections based on access patterns; and program code, stored on the one or more computer-readable tangible storage devices, for selecting a copy of the data object in each collection to be in a set of remaining copies of the data object located in the other storage devices sufficient to reduce the time for responding to the requests for the data object based on the access predicted to the copies of the data object.

25. A method for managing copies of a data object, the method comprising:

a computer grouping a plurality of storage devices into groups such that all of the storage devices in each of the groups have a similar set of parameters for power use as a function of time of day, wherein the grouping is repeated until a center of each group does not change within a selected tolerance, and the center of each group is identified from parameters for power use of each storage device in each of the groups;

the computer determining respective, total numbers of copies of each of the data objects in the storage devices in each group to satisfy historical levels of concurrent requests for the data object; and the computer deleting additional copies of the each of the data objects in the storage devices in the each of the groups not needed to satisfy the historical levels of concurrent requests for the data objects.

26. The method of claim 25, wherein the each group in the groups has a set of parameters for power use in which each parameter for power use is for a time of day and in which the all of the storage devices in the each group has the set of parameters for power use.

27. A computer system for managing copies of data objects in a network data processing system, the computer system comprising:

a CPU, computer-readable tangible storage device, and a computer-readable memory;

first program instructions to group a plurality of storage devices into groups such that all of the storage devices in each of the groups have a similar set of parameters for power use as a function of time of day, wherein the grouping is repeated until a center of each group does not change within a selected tolerance, and the center of each group is identified from parameters for power use of each storage device in each of the groups;

second program instructions to determine respective, total numbers of copies of each of the data objects in the storage devices in each group to satisfy historical levels of concurrent requests for the data objects; and third program instructions to delete additional copies of the each of the data objects in the storage devices in the each of the groups not needed to satisfy the historical levels of concurrent requests for the data objects, wherein the first, second, and third program instructions are stored on the computer-readable tangible storage device for execution by the CPU via the computer-readable memory.

* * * * *